United States Patent [19]
van der Lely

[11] Patent Number: 6,148,255
[45] Date of Patent: Nov. 14, 2000

[54] VEHICLE COMBINATION

[75] Inventor: Olaf van der Lely, Zug, Switzerland

[73] Assignee: Massland N.V. A Dutch Limited Company, Maasland, Netherlands

[21] Appl. No.: 09/330,375

[22] Filed: Jun. 3, 1999

Related U.S. Application Data

[63] Continuation of application No. PCT/NL98/00569, Oct. 1, 1998.

[30] Foreign Application Priority Data

Oct. 8, 1997 [NL] Netherlands ............................ 1007225

[51] Int. Cl.$^7$ ...................................................... B05B 9/06
[52] U.S. Cl. ................................ 701/50; 701/205; 701/96
[58] Field of Search ................................ 701/50, 205, 96, 701/300; 340/901, 902, 903; 342/95; 180/14.3, 14.4

[56]    References Cited

U.S. PATENT DOCUMENTS

| 3,651,882 | 3/1972 | Loesch ................................... | 180/14.3 |
| 5,331,561 | 7/1994 | Barrett et al. ........................... | 701/205 |

Primary Examiner—William A. Cuchlinski, Jr.
Assistant Examiner—Arthur D. Donnelly
Attorney, Agent, or Firm—Penrose Lucas Albright

[57]    ABSTRACT

The combination of a master vehicle which may be an agricultural tractor, transport or self-propelled implement, and one or more satellite vehicles which also may be tractors, agricultural transports or self-propelled agricultural implements. The satellite vehicle is controlled by a control system from the master vehicle, such control being exercised radiographically or by cable via a tramline system. The satellite vehicle has video cameras arranged to view both forwardly and to the rear and transmit views which can be seen on a monitor in the master vehicle. The control system includes computer programs for selectively causing the satellite vehicle to travel either parallel to the master vehicle at a selected distance therefrom or to follow the track of the master vehicle. Control of the satellite vehicles is selectively automatic in at least two modes or manual, the manual controls being utilized at the end of a pass across a parcel of land to turn the satellite vehicle into a position for commencing a second pass over the parcel of land. A coupling member is provided so that the satellite vehicles can be towed by the master vehicle.

38 Claims, 1 Drawing Sheet

VEHICLE COMBINATION

RELATED APPLICATION

This Application is a continuation of International Application No. PCT/NL98/00569, filed Oct. 1, 1998.

FIELD OF THE INVENTION

The invention relates to a vehicle combination comprising a master vehicle, such as an agricultural tractor which has a control system for controlling one or more satellite vehicles.

SUMMARY OF THE INVENTION

According to an inventive feature the satellite vehicle is unmanned. In this, manner it is possible at least to double the working capacity of one person.

According to an inventive feature the satellite vehicle is used as an implement carrier or is designed as a transport wagon, a mower-thresher or any other self-propelled agricultural implement.

The vehicle combination according to the invention has the advantage that as single operator can work with two or more implements at the same time, whereby the working width is a least doubled.

For the purpose of controlling the satellite vehicle, according to an inventive feature the control system is designed as a remote control system, such as a radiographic remote control system or a cable connection or both between the master vehicle and the satellite vehicle.

According to an aspect of the invention an implement carried or drawn by the satellite vehicle or a self-propelled agricultural implement or both can be controlled automatically or manually via the remote control system.

In accordance with still another inventive feature, by means of the control system, an instruction program can be effectuated for controlling the satellite vehicle. In this manner the driver of the master vehicle can be devote his attention to driving the vehicle without having to concentrate on operating the satellite vehicle. For example, according to a further inventive feature, the driver can select an instruction program that causes the master vehicle and the satellite vehicle travel parallel to each other or for the satellite vehicle to follow the track of the master vehicle. In the first situation two operations can take place beside each other whereas in the second situation two operations take place with the satellite vehicle behind the master vehicle. Depending on the particular operation, different instruction programs can be utilized. In order to maintain the desired distance between the satellite vehicle and the master vehicle, according to an inventive feature, the master vehicle or the satellite vehicle or both comprise distance measuring means with the aid of which the distance between the master vehicle and the satellite vehicle is predetermined.

According to an inventive feature the master vehicle or the satellite vehicle or both comprise angle measuring means with the aid of which the angle between the master vehicle and one or more satellite vehicles can be predetermined. In this manner, in cooperation with the distance measuring means, the position of a satellite vehicle relative to the master vehicle is predetermined and, if required, on the basis thereon the direction or the speed of both of one of the two vehicles can be coordinated.

In accordance with again another aspect of the invention, the master vehicle or the satellite vehicle or both comprise speedometers by means of which the driving speeds of the two vehicles are predetermined.

According to a further inventive feature the master vehicle or the satellite vehicle or both comprise track-following means, such as a camera with picture analysis, or a mechanical feeler element for following a track/tramline.

For the purpose of achieving precision-farming by means of the vehicle combination, according to a further aspect of the invention, the master vehicle or the satellite vehicle or both comprise a navigation system, such as GPS, with the aid of which the position of the master vehicle or the satellite vehicle or both are monitored.

In accordance with a further inventive feature it is also possible to switch the control system to manual control, so that the satellite vehicle can be controlled by hand. This may, in particular, be important when at the end of a working pass the satellite vehicle has to be turned to be positioned for a new working pass. If this is effected automatically, a relatively large amount of equipment is required, whereas it can be performed quickly, cheaply and efficiently by means of a simple manual control mechanism. according to again another feature, the satellite vehicle is provided with a camera and the master vehicle is provided with a monitor which received pictures from the camera and shows them on a screen. In this manner the driver of the master vehicle can supervise the satellite vehicle. In a preferred embodiment of the invention, there is disposed a camera so that the front and rear side of the satellite vehicle. Because of this measure the driver of the master vehicle can closely monitor the course of the satellite vehicle, while also the functioning of an agricultural implement coupled to the satellite vehicle can be checked.

According to again another inventive feature the satellite vehicle is provided with coupling means with the aid of which agricultural implements, such as a fertilizer spreader, a seeder, a field sprayer, a mower and a hay-making machine, can be coupled to the satellite vehicle.

For the purpose of transporting the satellite vehicles by road, the master vehicle comprises coupling means with the aid of which the satellite vehicles can be coupled to the rear or the front sides or both of the master vehicle.

In accordance with another inventive feature, the vehicle combination is provided with an implement control system for controlling an implement, which control system is designed so that also other implements disposed on the master vehicle or a satellite vehicle or both can be controlled by the relevant implement control system. Because of this measure, a plurality of implements can be controlled by means of one implement control system.

The invention also relates to a satellite vehicle which can be used in a vehicle combination as described above.

The invention furthermore relates to control system that can be utilized in a vehicle combination as described above.

BRIEF DESCRIPTION OF THE DRAWING

The invention will be explained in further detail with reference to an accompanying drawing.

DETAILED DESCRIPTION OF THE PREFERRED EMBODIMENTS

Figure 1:
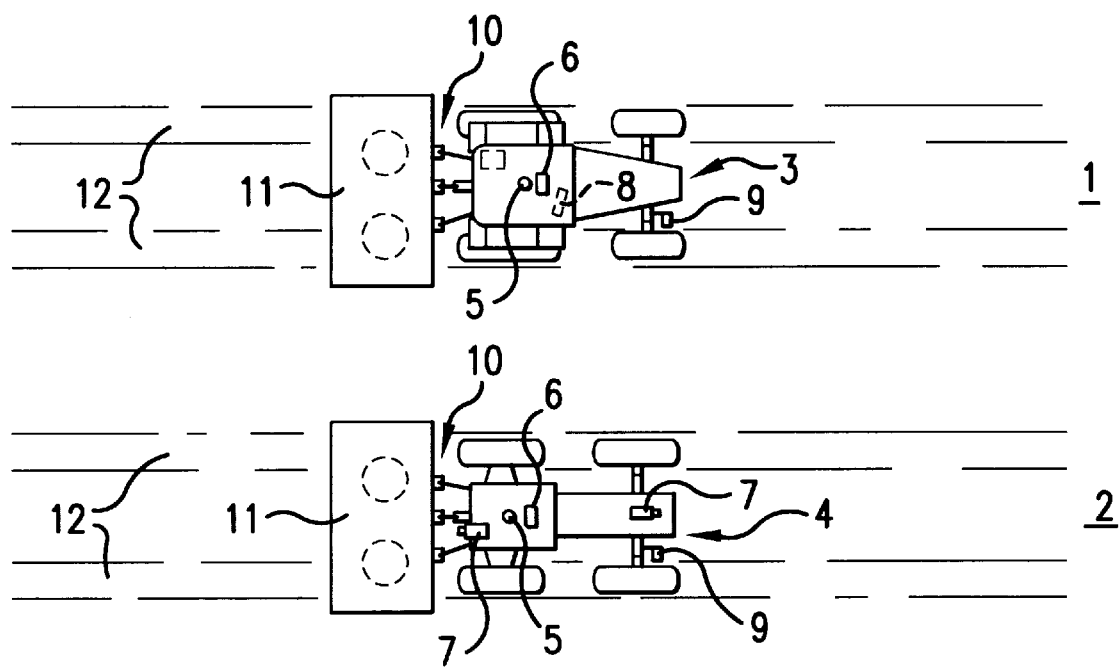
FIG. 1 is plan view of a master and satellite vehicle combination in accordance with the invention.

FIG. 1 shows a master and satellite vehicle combination 1 which is active on a parcel 2. The vehicle combination 1 comprises a master vehicle which in the present embodiment is an agricultural tractor 3 as well as a satellite vehicle 4 which is actively spaced at some distance therefrom. Satellite vehicle 4 is an unmanned vehicle that is provided with an own power supply.

Both agricultural tractor 3 and the satellite vehicle are provided with a control system for controlling satellite vehicle 4. In the present embodiment communications between agricultural tractor 3 and satellite vehicle 4 are via radiographic connections. As a consequence thereof both the agricultural tractor and satellite vehicle 4 comprise an aerial 5. However, it is also possible to have the communication between the two vehicle or a plurality of vehicles take place by means of a cable connection.

The control system additionally comprises switch means with the aid of which an instruction program for a relevant satellite vehicle 4 can be activated. In the present embodiment a program for parallel travel has been selected. Agricultural tractor 3 and satellite vehicle 4 are further provided with distance measuring means 6 with the aid of which the distance between agricultural tractor 3 and satellite vehicle 4 is determined. If a given distance between the two vehicles has been selected and one of the vehicles deviates therefrom, this deviation is adjusted automatically by means of the control system.

For precision-farming by means of vehicle combination 1, it is possible to connect the control system to a navigation system, such as GPS, or a field mapping system or both.

Near its front and rear side, satellite vehicle 4 is further provided with cameras 7 by means of which views of both the front and rear sides of satellite vehicle 4 can be received. These views are transmitted via aerial 5 to agricultural tractor 3 where they are shown on a monitor 8 disposed in the agricultural tractor 3. Satellite vehicle 4 is additionally provided with a speedometer 9 by means of which the velocity of satellite vehicle 4 is monitored. The signal supplied by speedometer 9 is transmitted via aerial 5 to the control system in agricultural tractor 3. Agricultural tractor 3 is also provided with a speedometer 9 by means of which the velocity of agricultural tractor 3 is determined and a signal from which is also supplied to the control system of satellite vehicle 4. In this manner the speed of agricultural tractor 3 and that of one or more satellite vehicles 4 are mutually equalized.

Both agricultural tractor 3 and satellite vehicle 4 are provided near their rear sides with a three-point lifting hitch 10 to which, in the present embodiment, centrifugal spreaders 11 are coupled. It is also possible to dispose, near the front sides of both agricultural tractor 3 and satellite vehicle 4, coupling means to which agricultural implements can be coupled.

The present vehicle combination 1 functions as follows:

After satellite vehicle 4 has been uncoupled from agricultural tractor 3, by means of the manual control mechanism satellite vehicle 4 is driven by the tractor to a tramline 12 on parcel 2. After satellite vehicle 4 has been positioned properly relative to tramline 12, which can be checked by one or both of cameras 7 or by means of the GPS navigation system, the tractor driver selects the appropriate control program. This implies that vehicles 3 and 4 are both automatically driven at a predetermined driving speed, which is checked by means of the speedometer 9. Furthermore there is determined with the aid of distance measuring means 6 whether satellite vehicle 4 is driving parallel to agricultural tractor 3. If one of the vehicles deviates as regards speed or direction from the predetermined tramline, the control system ensure that the relevant vehicle is adjusted accordingly. By means of the control program the two centrifugal spreaders 11 are also controlled so as to travel parallel to each other. In this manner it is possible to spread material along a width of 36 meters or more in one working pass by mean of centrifugal spreaders 11. As a result thereof the spreading capacity is doubled. When vehicle combination 1 has arrived at the end of the parcel, the tractor driver switches to manual control with the aid of the switch means. This results in automatic switching off of the centrifugal spreaders 11 or any other agricultural implements which are carried or otherwise moved by vehicles 3 and 4. Subsequently the tractor driver maneuvers satellite vehicle 4 along the headland of parcel 2 towards a new working pass, which in the present situation is a next tramline. By means of cameras 7 and optionally the GPS navigation system, the tractor driver can check whether satellite vehicle 4 is correctly positioned relative to the tramline. Then the tractor driver drives agricultural tractor 3 to a next tramline and activates the program for parallel. After material from centrifugal spreaders have been spread over the whole parcel 2, satellite vehicle 4 is coupled to the rear side of agricultural tractor 3 for the purpose of transporting said satellite 4 to another parcel or to the farm.

Although I have described the preferred embodiments of my invention, it is to be understood that it is capable of other adaptations and modifications within the scope of the following claims.

Having disclosed my invention, what I claim as new and to be secured by Letters Patent of the United States of America is:

1. A vehicle combination comprising a master vehicle an unmanned satellite vehicle, a control system in said master vehicle for controlling said satellite vehicle, control means in said satellite vehicle, said control system sending signals to said control means for controlling the velocity and direction of travel of said satellite vehicle so that it automatically travels in the same direction and at the same velocity as said master vehicle, and devices having agricultural utility connected to said master vehicle and to said satellite vehicle.

2. A vehicle combination in accordance with claim 1, wherein said master vehicle and said satellite vehicle both comprise tractors.

3. A vehicle combination in accordance with claim 2, wherein said devices comprise centrifugal spreaders.

4. A vehicle combination in accordance with claim 1 wherein said satellite vehicle and said device connected thereto comprise transport means.

5. A vehicle combination in accordance with claim 1 wherein said device connected to said satellite vehicle comprises an agricultural implement.

6. A vehicle combination in accordance with claim 1 wherein said control system comprises a radiographic remote control system.

7. A vehicle combination in accordance with claim 1 wherein said control system comprises a tramline system.

8. A vehicle combination in accordance with claim 7 wherein said control system comprises a cable connection.

9. A vehicle combination in accordance with claim 1 wherein said control system comprises a remote control system.

10. A vehicle combination as claimed in claim 9 wherein said satellite vehicle is selectively controlled automatically or manually by means of said remote control system.

11. A vehicle combination in accordance with claim 9 which comprises a plurality of computer instruction programs which selectively and automatically control the velocity and direction of travel of said satellite vehicle.

12. A vehicle combination in accordance with claim 11 wherein one of said computer instruction programs which can be selected for controlling said satellite vehicle causes said satellite vehicle to move parallel to said master vehicle and another said computer instruction program which can be selected for controlling said satellite vehicle causes said satellite vehicle to follow the track of said master vehicle.

13. A vehicle combination in accordance with claim 1 comprising distance measuring means which perform the function of measuring the distant between said master vehicle and said satellite vehicle.

14. A vehicle combination in accordance with claim 1 which comprises angle measuring means which performs the function of measuring the angle between said master vehicle and said satellite vehicle relative to the position, direction and track of travel of said master vehicle.

15. A vehicle combination in accordance with claim 1 which comprises speedometer means for performing the function of determining the velocities of said master vehicle and said satellite vehicle.

16. A vehicle combination in accordance with claim 1 comprising track-following means.

17. A vehicle combination in accordance with claim 16 wherein said track-following comprises a video camera.

18. A vehicle combination in accordance with claim 16 comprising track means wherein said track-following means comprises a mechanical feeler element for following said track means.

19. A vehicle combination in accordance with claim 1 wherein said master vehicle comprises a navigation system with the aid of which the position of said master vehicle can be ascertained.

20. A vehicle combination in accordance with claim 19 wherein said satellite vehicle comprises navigation means which performs the function of determining the position of said satellite vehicle.

21. A vehicle combination in accordance with claim 1 wherein said satellite vehicle comprises a navigation system with the aid of which the position of said satellite vehicle can be ascertained.

22. A vehicle combination in accordance with claim 1 wherein said control system comprises a manual control mechanism for controlling said satellite vehicle manually.

23. A vehicle combination in accordance with claim 1 wherein said satellite vehicle is provided with a video camera and said master vehicle is provided with a monitor which receives views from said video camera which are displayed on a screen of said monitor.

24. A vehicle combination in accordance with claim 23 which comprises a further video camera, said first mentioned video camera being on the forward side of said satellite vehicle and said further video camera being disposed on the rear side of said satellite vehicle.

25. A vehicle combination in accordance with claim 1 wherein said satellite vehicle comprises coupling means for connecting said device thereto.

26. A vehicle combination in accordance with claim 25 wherein said device is coupled to said satellite vehicle by said coupling means and comprises an agricultural implement.

27. A vehicle combination in accordance with claim 26 wherein said agricultural implement comprises a fertilizer spreader.

28. A vehicle combination in accordance with claim 26 wherein said agricultural implement coupled to said satellite vehicle comprises a seeder.

29. A vehicle combination with claim 26 wherein said agricultural implement coupled to said satellite vehicle comprises a field sprayer.

30. A vehicle combination in accordance with claim 26 wherein said agricultural implement coupled to said satellite vehicle comprises a mower.

31. A vehicle combination in accordance with claim 26 wherein said agricultural implement coupled to said satellite vehicle comprises a hay-making machine.

32. A vehicle combination in accordance with claim 1 comprising coupling means by means of which said satellite vehicle can be coupled to said master vehicle.

33. A vehicle combination in accordance with claim 1 wherein said devices connected to said master vehicle and to said satellite vehicle comprise agricultural implements, and comprising further control means for performing the function of controlling a variety of said agricultural implements connected to said master vehicle and said satellite vehicle.

34. A vehicle combination comprising a master vehicle, an unmanned satellite vehicle, a control system for controlling said unmanned satellite vehicle, vehicle control means in said satellite vehicle, said control system sending signals to said control means for controlling the velocity and direction of travel of said satellite vehicle so that said satellite vehicle automatically travels in the same direction and at the same velocity as said master vehicle, said master vehicle and said satellite vehicle both comprising self-propelled agricultural machines.

35. A vehicle combination in accordance with claim 34 wherein said self-propelled agricultural machines comprise agricultural tractors.

36. A vehicle combination in accordance with claim 34 wherein said self-propelled agricultural machines comprise mower-threshers.

37. A vehicle combination in accordance with claim 35 wherein at least one of self-propelled agricultural machines comprises a transport vehicle.

38. A method of controlling a manned master vehicle which also contains controls for controlling an unmanned satellite agricultural vehicle, comprising the steps of selecting and activating a computer instruction program causing said satellite vehicle to travel parallel to said master vehicle or to follow in the track of said master vehicle, placing said master vehicle and said satellite vehicle under the selected automatic control of said master vehicle to make a working pass across a parcel of land, selectively changing the control of said satellite vehicle from said master vehicle at the end of the working pass of said satellite vehicle across said parcel of land and automatically positioning said satellite vehicle by means of said manual control for a new working pass across said parcel of land, and thereafter selecting one of said automatic controls for controlling the travel of said satellite vehicle for its travel across said parcel of land in said new working pass.

* * * * *

UNITED STATES PATENT AND TRADEMARK OFFICE
CERTIFICATE OF CORRECTION

PATENT NO. :  6,148,255
DATED      :  November 14, 2000
INVENTOR(S):  OLAF VAN DER LELY It is certified that error appears in the above-identified patent and that said Letters Patent is hereby corrected as shown below:

On the cover page, the name of the assignee is spelled incorrectly.

"Massland" should be --Maasland--.

Signed and Sealed this

Twenty-ninth Day of May, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO. : 6,148,255
DATED : November 14, 2000
INVENTOR(S) : Olaf Van Der Lely It is certified that error appears in the above-identified patent and that said Letters Patent is hereby corrected as shown below:

Title page,
Item [73], Assignee, "Massland" should be -- Maasland --.

Signed and Sealed this

Tenth Day of May, 2005

JON W. DUDAS
*Director of the United States Patent and Trademark Office*